July 2, 1968  H. N. FAIRBANKS  3,390,620
DATA RECORDING APPARATUS
Filed April 15, 1964
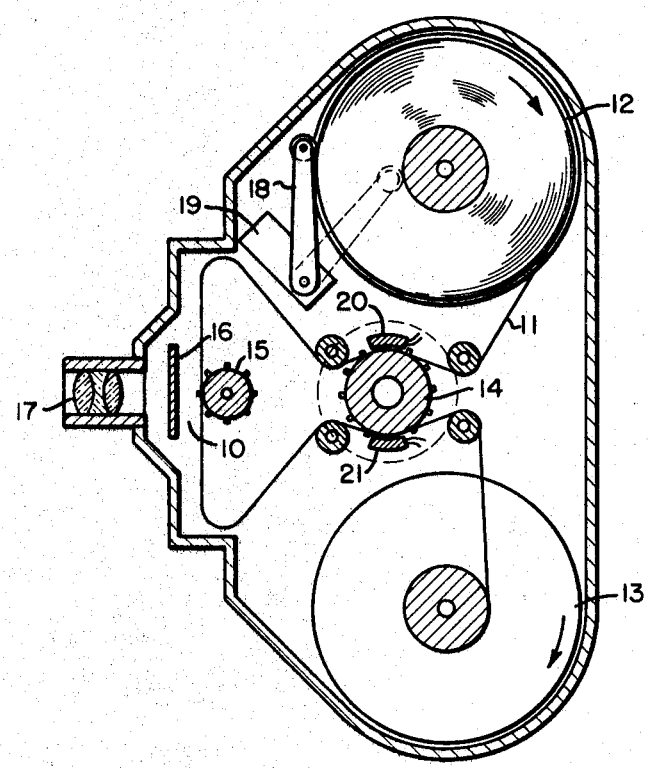
INVENTORS
HENRY W. FAIRBANKS
BY Stanley Bilsky
ATTORNEY > United States Patent Office 3,390,620
Patented July 2, 1968

3,390,620
DATA RECORDING APPARATUS
Henry N. Fairbanks, Rochester, N.Y., assignor to Itek Corporation, Lexington, Mass., a corporation of Delaware
Filed Apr. 15, 1964, Ser. No. 360,006
13 Claims. (Cl. 95—1.7)

ABSTRACT OF THE DISCLOSURE

This invention provides an improved method and apparatus for recording random events on a photosensitive copy medium, storing these recorded events, permanently recording selected events and subsequently erasing the photosensitive copy medium for further use. The apparatus and process of this invention are practiced by means of a camera for recording on a photosensitive copy medium wherein the camera comprises a means for uniformly deactivating the copy medium so that the copy medium is uniformly activatable by radiation and means for exposing the copy medium to radiation for producing a latent image in the medium of an event. In a preferred embodiment the deactivating means includes a means for heating the copy. In another preferred embodiment the copy medium is in the form of a film strip and the camera is provided with means for advancing this film strip sequentially to a deactivating station wherein the copy medium is made uniformly activable by radiation at an exposure gate wherein the copy medium is exposed to activation to produce a latent image in the copy medium. This film strip may be stored on reels and passed from a first reel through a deactivating station and an exposure station and then on to a second reel as a means of storage. The film strip may also form a continuous loop. Another embodiment is wherein the camera system forms a reversible system, e.g. the film strip is passed from a first reel past a deactivating station and an exposure station to a storage reel as above described. When the film strip on the first reel is depleted, a switch is activated thereby reversing the path of the film strip. The storage reel then passes the film strip through an additional deactivation station and back through the exposure station and back onto the first reel.

---

This invention relates to a system and a camera for recording an image or images of a random event on a photosensitive medium comprising a photoconductor, and more particularly to a system and camera for recording latent images on a reusable photosensitive medium comprising a photoconductor that is deactivatable to remove such latent images if the random event does not occur and that is developable to make visible such latent images if the latent images depict the random event.

There are many situations and circumstances in which it is desirable to record images of a random event, but it is impossible to predict with certainty when the event will occur. The visitations of thieves and robbers or fraudulent check or currency passers, the occurrence of accidents, explosions, and sudden or especially significant turnings or results in experiments are examples of such random events. To record images of events such as these with ordinary cameras and ordinary, nonreusable photographic film can require the expenditure of a great deal of expensive film before the anticipated event occurs.

The photosensitive medium for use in the present event recording system and camera is reusable and is capable of producing latent images that can be developed into visible images if the event occurs and that can be deactivated if the event does not occur so that the medium is available for re-exposure without loss.

Commonly owned copending Berman et al. application Ser. No. 199,211 filed May 14, 1962, the details of which are incorporated herein by reference, discloses such a photographic imaging or copy media comprising photoconductive materials, i.e., materials having light activatable electrons, adaptable to use in the systems of the present invention. Exposure of such media to an image pattern of activating radiation renders chemically reactive those portions of the photoconductor media which are stuck by radiation. The activated irradiated medium is next contacted with a developer system to effect a chemical redox reaction, on such contact, between the developer system and the activated chemically reactive portions of said medium. For example, according to the teachings of the copending application a filled or coated paper comprising a photoconductor such as titanium dioxide is exposed to an image pattern of radiation, and is then developed by simple contact with a developer system forming an image by redox reactions occurring at activated chemically reactive portions of the photoconductor. For example, the exposed medium may be contacted with a solution containing ions of a metal such as copper, silver, mercury, gold. The ions are reduced to free metal on contact with activated chemically reactive portions of the copy medium. Although exposures can be used which are sufficient to cause precipitation of such an amount of metal ion to free metal as will form a visible image in the copy medium, shorter exposure times can also be used. These result in the deposition of amounts of free metal which are insufficient to form visible images. Such "latent" developed images" can be subsequently amplified by contact with developer systems of a type known in the silver halide photographic arts, for example, such as those comprising silver ion in admixture with a reagent forming a redox system, such as hydroquinone. Developer systems of this type tend to deposit further free metal on a surface where free metal is already present, and can be used in the present invention to amplify a priorly foamed "latent developed image" or can be used alone in a single developing step to form a visible image directly.

The exposed photoconductor having a latent image pattern can also be deactivated for effectively erasing the latent image and rendering the photoconductor uniformly activatable by radiation in a subsequent exposure so that the medium is reusable.

As disclosed in copending application Ser. No. 199,211 photoconductor media usable with the present invention can be deactivated or made uniformly activatable by radiation by heating, by storage in darkness, by infra-red radiation, and by corona discharge, as from a Tesla coil. Furthermore, a developed image in said medium may be chemically erased or bleached without impairing the sensitivity of the photoconductor, so that the medium may be reused even after a latent image has been developed.

It is an object if this invention to reduce the cost of recording images of random events the occurrence of which cannot be predicted.

Another object of the invention is to use a reusable photosensitive medium for recording latent images of events and to develop the latent images to produce visible images of certain of the events selected from those recorded, and to erase the developed images and reuse the medium whenever the images do not depict events for which a permanent record is desired.

Another object of the invention is to record image events on a reusable photosensitive medium, to develop the medium for making a permanent record of selected events from those recorded, and to erase and reuse the medium after it has recorded events not selected for a permanent record.

Another object of the invention is to adapt a simple camera for recording events on a reusable photosensitive medium.

Another object of the invention is to deactivate latent images or "fogging" from a photosensitive medium in a camera in which the medium is subsequently exposed to radiation for producing latent images.

Another object of the invention is to reverse the direction of travel of a photosensitive medium through a camera so as to deactivate and re-expose the medium.

To these and other ends the invention resides in certain improvements, procedures, and combinations of parts, all as will be hereinafter more fully described, the novel features being pointed out in the claims at the end of the specification.

The drawing shows a partially schematic, partially sectioned side view of a camera according to the invention.

For illustrating the invention, the drawing shows a motion picture type camera with intermittent film advance through an exposure gate 10, but the invention can also be practiced with a still camera and with cameras using either roll or sheet film. Also, a camera according to the invention need not necessarily be intermittent drive but could be continuous drive or could be a trip camera such as for recording radiation from oscilloscopes or other instruments. The type of events or actions to be recorded and the particular type of reusable photosensitive medium desired will control the selection of camera to be used in practicing the invention.

As illustrated, a reusable photosensitive medium 11, the photosensitive component of which is a photoconductor, is coiled upon an upper or supply spool 12, threaded over drive and loop control sprocket 14, through film gate 10 where it is moved by intermittent motion driver 15, back over drive sprocket 14, and onto the lower or takeup spool 13. A shutter 16 controls radiation falling on photoconductive strip 11 in film gate 10, and a lens system 17 focuses an image pattern on photoconductive strip 11. The drive and advancing mechanisms for the photoconductive medium 11 in the illustrated camera are partially schematic and can be any of a variety of well-known strip advancing mechanisms such as used in ordinary photographic cameras. For example, intermittent motion driver 15 can be a Geneva movement or pull down claw, and drive sprocket 14 can be replaced by many arrangements of driving devices synchronized with intermittent driver 15 for maintaining loops in the conventional manner.

The strip advancing mechanisms in the illustrated camera are reversible so that photoconductive strip 11 can be driven from spool 12 onto 13 and then reversed for intermittent drive back from spool 13 to spool 12. Supply and takeup spools thus alternate in function, and intermittent driver 15, and driver 14 reverse directions and accomplish intermittent movement of photoconductive strip 11 through gate 10 in opposite directions. Shutter 16 cooperates with photoconductive strip 11 for exposing the latter to radiation for making latent images in the photoconductive strip during advancement in each direction. Conventional mechanisms are known in the photographic motion picture projector arts for providing intermittent drive of a strip in two directions, but such mechanisms have been unknown in cameras where they formerly would have been inoperative and completely opposite to the purpose of a camera.

Guide roller 18 riding on the outer convolution of the photoconductive strip coiled on spool 12 operates a switch 19 for reversing the direction of drive of photoconductive strip 11 when supply spool 12 is nearly exhausted. As photoconductive strip 11 is rewound on upper spool 12 during reverse drive of the camera, arm 18 activates switch 19 for re-reversing the direction of drive of photoconductive strip 11 when upper spool 12 is nearly full so that the ends and a few terminal convolutions of photoconductive strip 11 remain fixed to both spools 12 and 13.

As an alternative to the reversible camera illustrated, a continuous loop of film could be employed and could be intermittently driven in one direction constantly. The duration of an anticipated event and the number of images desired of such event would affect the selection of reversible drive camera or a continuous loop camera.

As mentioned above, and as disclosed in copending application Serial No. 199,211, the photoconductor of strip 11 can be deactivated by several means for effectively erasing latent images or "fogging" and for making photoconductive strip 11 uniformly activatable by radiation. A preferred means of erasing photoconductive strip 11 in the illustrated camera is by heaters 20 and 21 that are preferably placed near the path of travel of photoconductive strip 11 over drive sprocket 14. Heaters 20 and 21 can conveniently be infra-red radiators or ordinary electric heater coils alternately energized under control of switch 19 so that heater 20 is hot whenever photoconductive strip 11 is being advanced from upper spool 12 to lower spool 13 but is not energized when photoconductive strip 11 is being driven in the opposite direction. Conversely, heater 21 is not energized when photoconductive strip is driven from upper spool 12 to lower spool 13, but is hot when photoconductive strip 11 is driven in the opposite direction. By the described arrangement, photoconductive strip 11 is heated before reaching the exposure gate 10 in each direction of its travel. Heaters 20 and 21 thus deactivate the photoconductor in strip 11, effectively erasing any latent image or "fogging" therein and rendering the photoconductor uniformly receptive to radiation to which it is exposed in gate 10.

In operation, the illustrated camera is set up to view scenes in which an event to be recorded can occur, for example, possible accidents, thieveries, robberies, experimental data production, etc. It is possible to include in the viewed scene a clock or instruments contributing information to the image events occurring. The camera is actuated for recording latent images of the viewed scene on photoconductive strip 11. During the advance of photoconductive strip 11 from upper spool 12 to lower spool 13, if an event occurs of which a permanent record is desired, the camera is stopped and photoconductive strip 11, as coiled on spool 13, is removed from the camera and processed to develop the latent image for producing a visible record.

As is often the case, no event for which a permanent record is desired will occur during the advancement of photoconductive strip 11 from spool 12 to spool 13. Under such circumstances, actuation of the camera is not stopped, and the camera automatically reverses the direction of travel of photoconductive strip 11. For advancement of photoconductive strip 11 from spool 13 to spool 12, heater 21 is energized and deactivates the photoconductive strip as it passes over drive sprocket 14 for effectively erasing the latent images recorded on the previous passage through gate 10. Between drive sprocket 14 and gate 10, photoconductive strip 11 is allowed to cool and is image receptive upon reaching gate 10 where photoconductive strip 11 is re-exposed for producing another set of latent images on its return trip to spool 12. During such return trip heater 20 is not energized so that the latent images produced in the film gate are not erased upon travel of photoconductive strip 11 past heater 20 on the way to spool 12.

If a permanent record is desired of any event which occurs during the advancement of photoconductive strip 11 from spool 13 to spool 12, the camera is stopped and spool 12 with its coil of photoconductive strip 11 is removed from the camera for developing the latent images to produce a permanent record of such event. If no such event occurs, the camera is not stopped and it automatically reverses the direction of travel of photoconductive strip 11. As photoconductive strip is advanced from spool 12 to spool 13, heater 20 is energized for deactivating the photoconductor in strip 11 as it passes over drive sprocket 14 so that photoconductive strip 11 is image receptive when it reaches gate 10 and can be exposed to radiation to produce another set of latent images.

The alternating advancement of photoconductive strip 11 through the illustrated camera is repeated until an event occurs of which a permanent record is desired, and then the camera is stopped and the photoconductive strip 11 removed and processed. Heaters 20 and 21, by their alternate operation, effectively erase previous images from photoconductive strip 11 and thus allow it to be reused.

The intervention of an operator is needed to stop the illustrated camera to remove photoconductive strip 11 for processing after desired images of an event were recorded. This is suitable for many situations, but automatic means can also be used for stopping the camera after images of a desired event have been recorded. Such automatic means can include electronic, photoelectric, electric, and mechanical, and can easily be arranged by persons skilled in the art depending upon the events to be recorded and the parameters of the camera and photoconductive strip 11.

In another modification, the supply spool 12 containing the photoconductive strip 11 may be located outside of the camera, in a radiation environment, so that the strip is fogged. While in prior systems "fogging" would adversely affect the recording medium for subsequent image recording, in the present invention at least a portion of the strip would be advanced into a radiation free environment, i.e., the camera illustrated in FIG. 1, and deactivated (as previously described) to render that portion of the strip activable upon exposure to subsequent image forming radiation.

It will thus be seen that the invention accomplishes its objects and while it has been disclosed by reference to the details of preferred embodiments, it is to be understood that such disclosure is intended in an illustrative, rather than a limiting sense, and it is contemplated that various modifications in the procedures, construction and arrangement of the parts will readily occur to those skilled in the art, within the spirit of the invention and the scope of the appended claims.

I claim:

1. A reversible camera for recording a latent image of a random event on a photosensitive medium comprising a photoconductor, said camera comprising: means for advancing a strip of said medium first in one direction and then in the opposite direction through an exposure gate wherein said photoconductor is exposed to activating radiation for producing a latent image in said photoconductor; and two deactivating heaters positioned near the path of travel of said strip on opposite sides of said gate, said heaters being alternately operable to heat said strip before its passage through said gate for effectively erasing any latent image in said photoconductor and for making said photoconductor uniformly activatable by radiation.

2. The camera of claim 1 wherein means for cooling said strip are positioned between each of said heaters and said gate.

3. A camera for recording a random event on a photosensitive strip which becomes reversibly activated and capable of causing chemical reaction upon exposure to activating radiation and capable of temporarily storing upon exposure an erasable, developable image, the combination comprising:
    (a) exposure means;
    (b) means for positioning portions of said strip at said exposure means for producing a first erasable, latent image thereon;
    (c) latent image erasure means;
    (d) means for selectively exposing said exposed strip bearing said first latent image to said erasure means and thereafter to said exposure means for erasing said first latent image and for recording a second latent image upon said strip or in the alternative developing said first erasable latent image upon said strip forming a non-erasable image directly thereon.

4. The combination as set forth in claim 3, wherein said latent image erasure means comprises a heater.

5. The combination as set forth in claim 3, wherein said strip comprises a photoconductor capable of forming an erasable latent electron image thereon in the absence of an externally-applied electric field and which photoconductor when activated by exposure is capable of causing chemical reaction.

6. The combination as set forth in claim 5 wherein said photoconductor comprises titanium dioxide.

7. The combination as set forth in claim 6 wherein said erasure means comprises a heater.

8. A camera for recording a random event on a photosensitive strip capable of temporarily storing an erasable, developable image, the combination comprising:
    (a) exposure means for producing an exposure area upon said strip;
    (b) a first latent image erasure means positioned at one side of said exposure area;
    (c) a second latent image erasure means positioned at the other side of said exposure area;
    (d) driving means for driving said strip in a first direction to expose said strip at said exposure area;
    (e) means for activating said first erasure means while said strip is being driven in said first direction by said driving means to erase any latent images that may be manifested upon said strip;
    (f) means for driving said strip in a second direction to re-expose said strip;
    (g) means for activating said second erasure means and for de-activating said first erasure means while said strip is being driven in said second direction by said driving means to erase any latent images that may be present upon said strip.

9. The combination as set forth in claim 8 wherein said first and second erasure means comprise heaters.

10. The combination as set forth in claim 8 wherein said strip comprises a photoconductor capable for forming a latent electron image thereon without the application of electrical energy thereto.

11. The combination as set forth in claim 10 wherein said photoconductor comprises titanium dioxide.

12. The combination as set forth in claim 11 wherein said first and second erasure means comprise heaters.

13. A process of recording a random event comprising the steps of:
    (a) erasing and thereafter exposing to patterns of radiation, repetitively, a photoconductive strip which becomes reversibly activated and capable of causing chemical reaction upon exposure to activating radiation, said strip capable of recording latent erasable electron images thereon corresponding to said patterns of radiation in the absence of an externally-applied electric field; and
    (b) stopping the erasing and exposing of said photoconductive strip upon the occurrence of a random event so that said strip can be developed to produce a non-erasable image depicting said random event.

References Cited

UNITED STATES PATENTS

| | | | |
|---|---|---|---|
| 3,057,997 | 10/1962 | Kaprelian | 250—65 |
| 3,147,679 | 9/1964 | Schaffert | 95—1.7 |
| 3,259,040 | 7/1966 | Kumagai | 95—11 |
| 3,273,477 | 9/1966 | De Hart | 95—11 |

JOHN M. HORAN, *Primary Examiner.*